US005285980A

United States Patent [19]

Combet et al.

[11] Patent Number: 5,285,980

[45] Date of Patent: Feb. 15, 1994

[54] DEVICE FOR EXTRACTING THE END OF A NEGATIVE FILM FROM A CARTRIDGE

[75] Inventors: Philippe Combet, Sassenage; Franck Gerstch, Meylan, both of France

[73] Assignee: Kis Photo Industrie, France

[21] Appl. No.: 940,670

[22] Filed: Sep. 4, 1992

[30] Foreign Application Priority Data

Sep. 5, 1991 [FR] France ............................... 91 11176

[51] Int. Cl.[5] ............................................. G03B 1/56

[52] U.S. Cl. ...................................... 242/71.1; 226/92

[58] Field of Search ...................... 242/55, 71.1, 78.8, 242/195, 1; 226/91, 92

[56] References Cited

U.S. PATENT DOCUMENTS

| | | | |
|---|---|---|---|
| 3,811,634 | 5/1974 | Edwards | 242/55 |
| 3,823,888 | 7/1974 | Zangenfeind et al. | 242/55 |
| 3,921,278 | 11/1975 | Basu | 242/71.1 X |
| 4,047,653 | 9/1977 | Starr | 226/92 |
| 4,074,870 | 2/1978 | Kaufman | 242/1 |
| 4,113,192 | 9/1978 | Osanai | 242/1 |
| 4,138,068 | 2/1979 | Kinoshita | 242/1 |
| 4,204,620 | 5/1980 | Wurfel | 226/91 |
| 4,283,021 | 8/1981 | Nishida | 242/55 |
| 4,482,232 | 11/1984 | Engelsmann et al. | 242/71.1 X |
| 4,646,177 | 2/1987 | Sanford et al. | 242/195 X |
| 4,674,702 | 6/1987 | Lenoble et al. | 242/195 |
| 4,787,546 | 11/1988 | Bradburg | 226/91 |

FOREIGN PATENT DOCUMENTS

| | | | |
|---|---|---|---|
| 1446239 | 6/1966 | France . | |
| 2223738 | 4/1990 | United Kingdom | 242/54 R |

*Primary Examiner*—Daniel P. Stodola
*Assistant Examiner*—John P. Darling
*Attorney, Agent, or Firm*—Harris Beach & Wilcox

[57] ABSTRACT

A device for extracting film from a cartridge having a gripper composed of two interacting elements and imparted with translational movement in the plane of the film cartridge. The two interacting elements of the gripper include a first stationary elements consisting of a disk section and a second rotating element capable of being imparted with rotational movement. The second rotating element also consists of a disk section of complementary shape to the first element. A cradle is provided to receive and hold the film cartridge in a stationary position. A mandrel positioned in one end of the cradle is provided to rotate the film spindle contained in the cartridge so that the end of the negative film can be grasped by the gripper and extracted from the cartridge.

7 Claims, 1 Drawing Sheet

DEVICE FOR EXTRACTING THE END OF A NEGATIVE FILM FROM A CARTRIDGE

BACKGROUND OF THE INVENTION

1. Field of the Invention

The invention relates to an original device for automatically extracting the end of a negative film from the cartridge which contains it, with a view to proceeding to develop it.

2. Discussion of the Prior Art

In a known manner, and most often, the negatives are stored in cartridges of generally cylindrical shape, comprising a rotation spindle along the axis of revolution of the cylinder, in the region of which spindle one of the ends of the negative is fixed. When the reel or the cartridge is ready for use, the free end of the negative film leaves the cartridge via a gate, extending a slot formed along the entire cartridge in the region of one of the generatrices of the cylinder.

Once all the negative film has been used, that is to say once the negative has arrived at the end of its travel, the cartridge is re-reeled in the conventional manner, the film then being entirely inside the cartridge. The above-mentioned gate is partially closed off so as to make the inside of the cartridge tight especially to light.

In the context of negative film automatic developing and printing devices, there is the problem of extracting the end of this negative film from the cartridge. Currently, the procedure is most often carried out manually by means of a blade equipped with an adhesive, which is introduced through the gate, then by the intermediary of the slot inside the cartridge, to stick to the negative film and thus to pull it out.

Attempts have thus been made to automate this principle of a blade equipped with an adhesive, however, it was found that the reliability of this device was far from being compatible with industrial-scale use. Furthermore, such a device uses consumables, namely the adhesive, which is in the form of a film which unrolls after each use, the blade simply pushing this adhesive film inside the gate then the slot.

Another device is also known, which calls for a member equipped with two flexible tabs, which enable, after various operations, the end of the film to be gripped, and thus to be extracted. Once again, automation proves tricky, because one of these operations involved the noise generated by the clicking of the film being released from a tab.

OBJECTS AND SUMMARY OF THE INVENTION

The invention provides a device for automatically extracting the end of a negative film which device is both simple to implement, and reliable, regardless of the direction of winding of the negative film in the cartridge.

This device for extracting the end of a negative film from the cartridge which contains it, said cartridge being cylindrical and comprising in a known manner at its periphery a slot situated along a generatrix, extending toward the outside in the plane comprising this generatrix and tangent to the cartridge along a gate which is partially closed off so as to keep out light, comprises:

a gripper imparted with a translational movement in the plane of the gate of the cartridge and composed of two elements interacting in a complementary manner, a first stationary element consisting of a disk section, whose diameter is slightly less than the length of the opening of the gate, a second element capable of being imparted with a rotational movement, also consisting of a disk section, substantially of the same diameter as that of which said first element is composed, and of complementary shape to said first element, articulated on a rotation spindle coincident with the center of the disk and situated in the same plane as said first element, said second element being intended to interact with the stationary element in order to form a gripper, a cradle, intended to receive the cartridge and to hold it in a stationary position, the gate being held in the plane of action of the gripper, a member, intended to provide the rotation of the spindle of the cartridge around which the negative film is wound.

In other words, the invention consists in no longer resorting to an adhesive or to flexible tabs introduced in the gate and the slot of the cartridge to extract the negatives, but to a gripper with mechanical action, capable of penetrating the gate and inside the cartridge so as to be able to grasp the free end of the negative.

According to an advantageous embodiment of the invention, the cartridge is held orientated in the cradle by means of magnets.

According to another advantageous embodiment of the invention, the rotational member of the spindle of the cartridge is securely fastened to a carriage which can move in translational along the direction of said rotation spindle, this carriage furthermore fulfilling the role of a vise, intended to hold the cartridge in place in its cradle.

The translational movements of the gripper, the rotational movements of said second element of the gripper, and the translational movements of the movable carriage of the rotational member of the spindle of the cartridge are correlated to each other by means of an automatic central unit.

According to a particularly advantageous embodiment of the invention, the device comprises, in the immediate vicinity of said plane, an optical detector, intended to detect the perforations of the negative film extracted, and to bring about the cutting of the leader or free end of the negative film between two of its perforations.

BRIEF DESCRIPTION OF THE DRAWINGS

The manner in which the invention can be implemented and the advantages which result therefrom will emerge more clearly from the embodiment example which follows given by way of indicative and non-limiting example support in the appended figures.

DETAILED DESCRIPTION OF THE INVENTION

Figure 1:
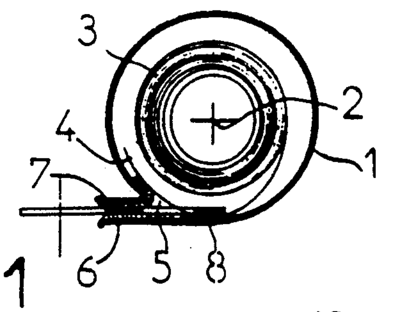
FIG. 1 is a diagrammatic representation in transverse section of a cartridge in which the gripper in accordance with the invention is represented.

FIG. 1 diagrammatically represents a transverse section of a cartridge, in its condition after rewinding the negative film, that is to say after taking various photographs.

This cartridge (1) generally of cylindrical shape, comprises a rotation spindle (2) on which the negative film (3) is wound, the leader (4) or free end of the negative film thus being inside the cartridge.

Traditionally, this type of cartridge comprises a slot (5) situated over the entire length of the cartridge, in the region of one of the generatrices of the cylinder. This slot (5) extends toward the outside via a gate (6) tangential to the cartridge and emerging in the region of the slot (5). In a known manner, this gate (6) comprises a lightweight felt lining (7) on the inside, intended to keep the inside of the cartridge tight to light.

According to the invention, the cartridge (1) is put in place in the device according to the invention in the region of a cradle one of whose elements (17) has been represented. This cradle comprises, in its lower part, magnets (not shown), intended to hold the cartridge (1) in orientation with the gate (6) parallel to the general plane of action of the device. According to one of the characteristics of the invention, the cartridge (1) is furthermore held in place by means of a carriage (18) acting as a vise, capable of moving in translation by guidance (20) in the direction of the rotation spindle (2) of the cartridge (1). This carriage (18) further comprises a mandrel (19) capable of being actuated to rotate in one direction or the other, and whose free end is intended to interact with the end of the rotation spindle (2) of the cartridge, which traditionally comprises a rectilinear projection, capable of interacting with the tenon-shaped free end of said mandrel (19). The latter is actuated in rotation by means of an electric motor not shown, and a torque limiter.

According to another fundamental characteristic of the invention, the device whose chassis (9) has been shown, comprises a gripper capable of being imparted with a translational movement, perpendicular to the translational movement of the member (18) previously described. This translational movement is applied in a more precise manner in the region of a carriage (10), guided in the region of guidance rails (11), the translational movement proper being provided by any appropriate means, such as for example a worm (not shown).

The carriage (10) comprises a gripper composed of two elements intended to interact with each other. A first stationary element (12) is fixed on the free end of the carriage (10) opposite the cartridge (1). This element (12) is composed of a portion of a disk and especially has a projection (14) directed substantially parallel to the cartridge (1). The diameter of the disk portion constituting this first element is slightly less than the length of the opening of the gate (6) of said cartridge.

The second element (8) is also composed of a disk portion, of the same diameter as that previously described, and situated in the same plane as the latter.

Furthermore, this second element (8) is capable of being imparted with a rotational movement about a spindle (13) coincident with the center of the disk. This second element, also in the shape of a disk section, comprises a projection (16), intended to interact when the gripper is in the closed position, with the projection (14) of said first stationary element.

In fact, when the gripper is in the closed position, the projection (14) penetrates into and interacts with the notch (15), made in said second element (8) of the gripper.

In fact, the assembly consisting of said first and second element is situated in the plane of the gate (6) and is intended to penetrate inside said cartridge as will be described later.

The two elements of the gripper are produced from a conducting material, typically from treated steel but are electrically insulated from each other.

Once the cartridge (1) is in place in its cradle (17) and the process for extracting the negative has been initiated, the carriage (18) comes into contact with the cartridge (1) and thus forms a vise. Correlatively, the mandrel (19) comes into place in the region of the end of the spindle (2) of the cartridge.

Simultaneously, the carriage (10) is also imparted with a translational movement, so as to direct the gripper (8, 12) inside the gate (6) of said cartridge. When the gripper (8, 12) is inside the gate (6), the second element (8) is imparted with a pivoting movement about its spindle (13), coming into position in contact with said stationary element (12).

If there is electrical contact between the two elements (8 and 12) of the gripper, that indicates that the leader (4) of the negative film (3) has not been gripped between these two elements. Consequently, the gripper reopens and, in the region of the mandrel (19), the spindle (2) is made to rotate in one direction or the other by about a quarter of a turn. The selection of the direction of rotation of the mandrel (19) is carried out by the detection of overintensity. In fact, if the mandrel (19) tends to give rise to a rotation of the rotation spindle (2) of the cartridge (1) in an inappropriate direction, for example, in a clockwise direction, for the diagram represented in FIG. 1, the leader (4) will brake the rotation and as a result an overintensity in the region of the drive motor of the mandrel (19) will occur. This overintensity is immediately detected, and gives rise to the rotation of the mandrel (19) in the other direction, by a quarter of a turn.

Figure 2:
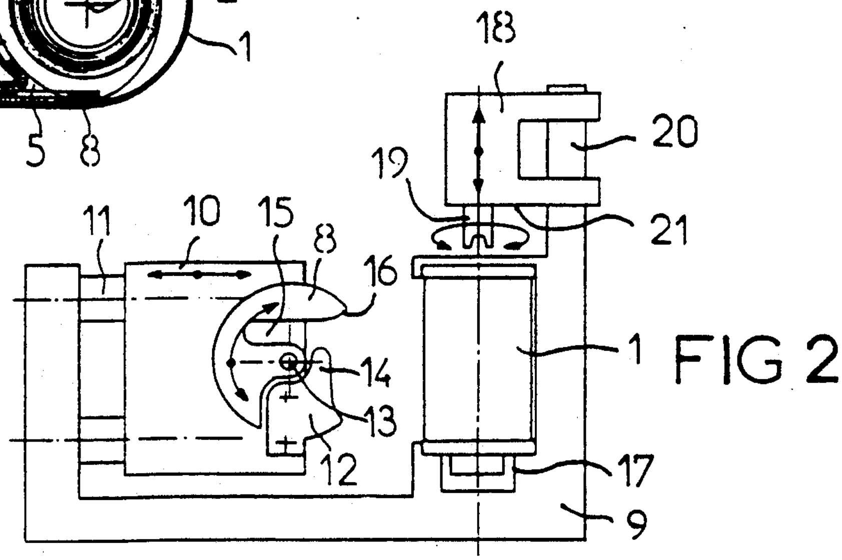
FIGS. 2, 3 and 4 are diagrammatic representations illustrating the operation of the device, the gripper being respectively disengaged, in the extraction position, and finally in the disengaged position gripping the end of the negative film.
Figure 3:
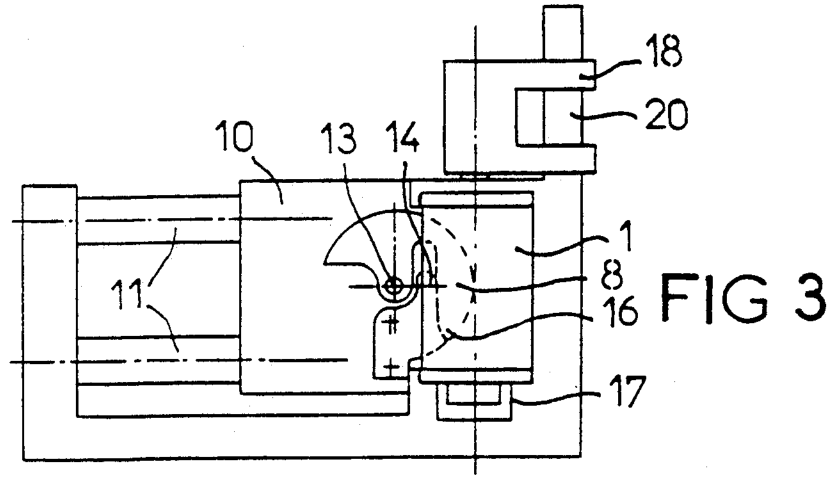

Once this quarter of a turn has been carried out, (the gripper having been previously reopened into the position of FIG. 2, whilst being held inside the gate and the cartridge) the second element (8) again undergoes a pivoting movement and closes on the stationary part (12) once again.

Figure 4:
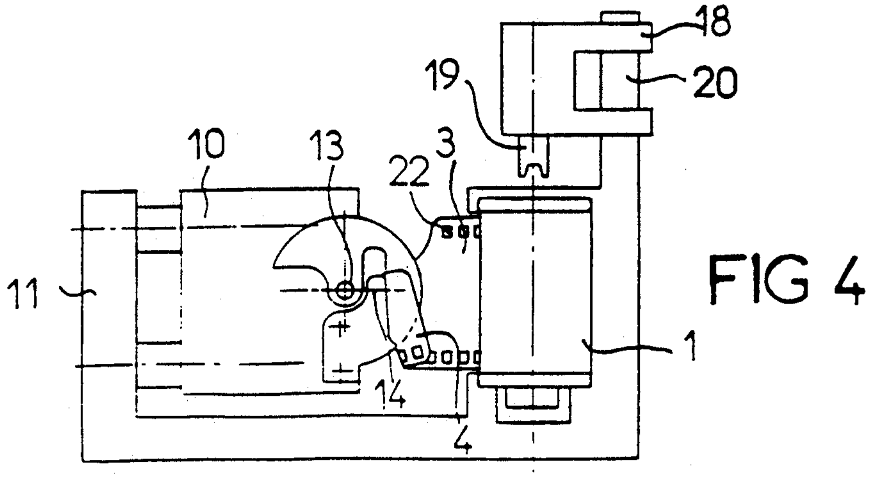

A new detection of the electrical contact takes place and in its absence, the negative film (3) acting as insulator, the gripper (8, 12) is held closed and the carriage (10) undergoes a new translational movement extracting the leader (4), and thus the negative film (3) from the cartridge (1) as represented in FIG. 4.

During the extraction, the rotation of the spindle (2) of the cartridge is made possible by the torque limiter relative to the mandrel (19).

Needless to say another system for detecting the correct grasping of the negative film may be provided, such as for example an optical cell. Furthermore, such a cell can be provided in the region of the immediate exit from the stationary gate of the cartridge (1), intended to detect the perforations (22) of the negative film (3), in order to give rise to the extraction of the negative film correlatively to the cutting off of the leader (4), especially between two perforations.

The disengagement of the system (18, 19) for driving the cartridge in rotation, and the release of the latter by the vise constituted by the carriage (18), thus takes place.

Moreover, it should be emphasized that the various translational movements, both of the carriage (18) and of the carriage (10), and the rotational movement of the gripper (12) are correlated to each other and managed and controlled for example by a program on microcomputer for example.

In this way it can be conceived that such a device proves completely suitable:

both in the context of an apparatus specific to this operation (autonomous and complementary equipment for a "photofinishing" installation, that is to say for the development and printing of any photographic films);

and in the context of an automatic installation for developing and printing photographic prints, in which it is sufficient simply to position the film cartridge in the cradle (17) manually or by automatically starting up the device, to obtain prints, after a few moments, no longer having to worry about any of the developing and printing stages of the negative film. Taking account of the use of purely mechanical and/or electrical phenomena, the reliability of such a device is considerably increased.

We claim:

1. A device for extracting the end of a negative film from a cartridge which contains the film, the cartridge being cylindrical and including a longitudinal slot having a light-tight gate formed thereabout, said gate extending away from the cartridge in a plane that is tangent to the cartridge along the length of said longitudinal slot, the device including:

a gripper imparted with a translational movement in the plane of the gate of the cartridge and composed of two elements that interact with each other to secure the end of the film so that it may be extracted from the cartridge;

said gripper having a first stationary element consisting of a first disk section positioned in a plane of action being coincident with the gate plane, the diameter thereof being slightly less than the length of the slot in the gate and a second rotating element capable of rotational movement, and consisting of a second disk section substantially of the same diameter as said first element, said second rotating element being rotatable about a rotation spindle coincident with the center of a circle whose circumference coincides with an arc segment of said first disk section and situated in the same plane as said first stationary element, said rotating element having a notch that interlocks with a projection formed on said first stationary element to form said gripper;

cradle means for receiving the cartridge and holding it in a stationary position, the gate of the cartridge thereby being held in the plane of action of the gripper; and a rotating member for engaging and rotating the spindle of the cartridge around which the negative film is wound.

2. The device as claimed in claim 1 wherein the cartridge is held orientated in said cradle means by magnets.

3. The device as claimed in claim 2 wherein said rotating member includes a rotary mandrel securely fastened to a carriage which can move in translation along the direction of the spindle, said carriage for moving said rotary mandrel securely against said spindle to rotate the spindle while also holding the cartridge in place in said cradle means.

4. The device as claimed in claim 3 wherein the translational movements of said gripper, the rotational movements of said second element of said gripper, and the translational movements of said movable carriage and said rotary mandrel are controlled by a pre-programmed microcomputer.

5. The device as claimed in claim 4 wherein said rotary mandrel is actuated by an electric motor having a torque limiter electrically connected to said pre-programmed microcomputer capable of detecting when the mandrel and spindle experience mechanical resistance to the rotation caused by the film unwinding inside the cartridge, the microcomputer being programmed to cause the electric motor to reverse rotation of the mandrel when said mechanical resistance is encountered so that the end of the negative film is repositioned within the cartridge.

6. The device as claimed in claim 5 wherein the two elements comprising said gripper are conductors of electricity so that detection by the microcomputer of electrical contact between the elements indicates that the end of the film has not been gripped by the gripper.

7. The device as claimed in claim 5 further including an optical detector electrically connected to said microcomputer and situated in the immediate vicinity of the plane of action of said gripper to detect perforations in the end of the negative film during extraction to indicate to the microcomputer that the end of the film has been gripped.

* * * * *